May 19, 1959     G. E. CONCIDINE     2,886,903
PRINTER'S DEMONSTRATION MODEL
Filed July 6, 1956
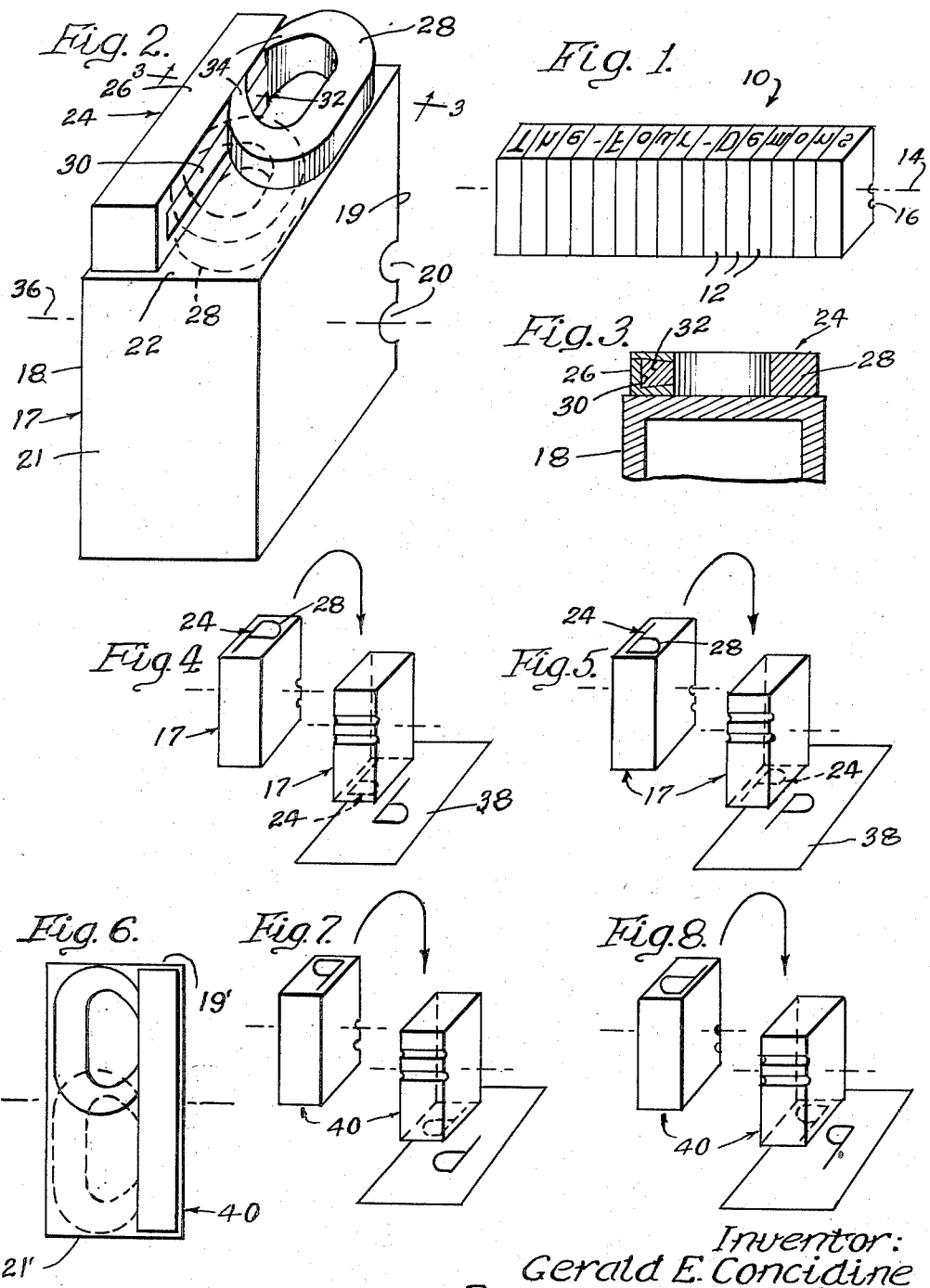
Inventor:
Gerald E. Concidine
By Paul H. Gallagher
Atty

United States Patent Office 2,886,903
Patented May 19, 1959

2,886,903
PRINTER'S DEMONSTRATION MODEL
Gerald E. Concidine, Glenview, Ill.

Application July 6, 1956, Serial No. 596,276

3 Claims. (Cl. 35—71)

The present invention relates to demonstration model for printer's type.

The invention has to do with the fact that letters as represented on type are opposite to their representation on paper, and it is often difficult for one learning the printing trade to recognize and distinguish the letters as represented on type so as to select the proper type elements to print the intended letters.

The difficulty mentioned becomes more pronounced in those cases where two letters are counterparts from the standpoint of the representation on type and on paper. For example, the letters "b" and "p" are such counterparts; the type that prints the letter "b" appears as the letter "p" when viewed directly on its printing face, and the type for the letter "p" appears as "b" when read directly. The same condition exists in the case of the letters "d" and "q." These four letters for that reason are known to printers as "The Four Demons" and the subject matter of this invention may be referred to as the "Demon Distinguisher."

An object of the invention is to provide a novel device for visibly and palpably demonstrating the distinguishing features of characters as represented on type and as printed on paper.

A further object is to provide a device of the foregoing character, which is in the form of a model (which may be large) representing a type element, easily handled and appropriate for using for demonstrating as in class work, and having portions relatively movable so as to selectively depict a character as represented on type and as printed on paper, both as viewed directly on the model.

Another and more specific object is to provide a demonstration device of the foregoing character capable of depicting selectively two related characters, both as represented on type and as printed on paper; for example, the letter "b" and the related letter "p," as well as the similarly interrelated letters "d" and "q."

Other objects and advantages of the invention will appear from the following detail description taken in conjunction with the accompanying drawing in which:

Figure 1 is a perspective view of a line of type of the kind used by printers;

Fig. 2 is a perspective view of the model device of the present invention;

Fig. 3 is a sectional view taken on line 3—3 of Fig. 2;

Fig. 4 is a diagrammatic view of the model shown in Fig. 2, indicating a manner of distinguishing the character represented thereby;

Fig. 5 is a view similar to Fig. 4 showing the same model but representing a different character;

Fig. 6 is a plan view of a model similar to that of Fig. 2 but representing a different character;

Fig. 7 is a view laid out according to Fig. 4 but including the model of Fig. 6, and Fig. 8 is a view laid out according to Fig. 5 but including the model of Fig. 6.

Referring in detail to the drawings, it is desired first to call attention to a difficulty in reading printer's type. As is well-known, the type that is used for directly printing or impressing on paper is arranged according to the mirror image of the character represented, and it is often difficult for a person to read the type directly. For some people, and particularly for beginners, the difficulty is the greatest in the case of certain letters which are made up of substantially identical elements and arranged in such a manner that reading of these characters on the type is extremely difficult. For example, the letters "b" and "p" are each made up of a stroke and a ball or loop arranged on the same side of the stroke. In the one case the loop is at one end of the stroke and in the other case at the other end. An identical situation exists in the case of the letters "d" and "q." In the case of other letters, for example, "e," "h," "l," etc., these are readily recognized in reading the type directly because of the arrangement of the elements making up the characters. Each has peculiar elements not present in any other letters.

Notwithstanding the difficulty in recognizing the letters mentioned, namely "b," "p"; "d," "q," it is possible to utilize a technique in recognizing and distinguishing the letters that is based upon the very similarity that causes the difficulty. For example, in the case of the letters "b" and "p" the ball or loop mentioned, when disposed for printing "p" on paper resembles "d" when read directly, and vice versa. The device of the present invention is a model having elements relatively shiftable for representing this interchange of elements.

Referring first to Fig. 1, a line of type 10 is made up of a plurality of individual type blocks 12. As is well-known in the printing trade, these blocks are arranged in lines and locked in the frame and utilized for directly printing on paper. In assembling the line they are put in position as oriented in Fig. 1, the operator being in the position of the observer of the present drawing. In the printing operation the line of type (with any other type making up the intended job) is disposed face down in a position turned 180° about the axis 14 from that shown in Fig. 1. The type blocks 12 have grooves or notches 16 in one side surface which serve as indicia for aligning all of the type blocks in the same orientation. These notches or grooves may also serve to identify different kinds of type as is well-known, but the latter features does not enter into the present invention.

The device 17 of Fig. 2 is one of a pair of similar devices or models constituting the subject matter of the invention. It is of the same general shape and proportions as any of the type blocks 12, although the type blocks 12 may vary in thickness, i.e., along the axis 14, according to the dimension in that direction of the individual letters or other characters represented. The model 17 may be made of any desired material such as wood, plastic, etc. Its size will depend upon the use to which it is to be put, as for example, when used for class work it may be on the order of twelve inches or more in height, but it may be of much smaller dimension if desired, as when a printer or student desires to carry it conveniently in his pocket.

The model 17 includes a block or body 18 having notches or grooves 20 in a side surface 19, similarly to the notches or grooves 16 (Fig. 1) so as to exactly depict the actual printing type and further to quickly enable the device to be oriented for proper recognition of the character represented thereon.

The model has a side surface 21 opposite the surface 19 and presented to the observer, and a top face 22 on which is disposed a character 24. This character as disposed in Fig. 2 appears when read directly as the letter "p." It includes a stroke 26 and a ball or loop 28. These two elements, namely the stroke and the ball, are preferably three-dimensional so as to closely simulate the character representation on the actual printing type. They may be formed of any suitable material, such as wood and plastic, etc. The stroke 26 (see Fig. 3) has a hollow portion forming a channel 30 extending substantially its length and the loop or ball has a projection 32 forming a tongue slidably fitted in the groove. The stroke is secured to the body or block 18 and the loop is movable relative thereto, being for that purpose free of connection with the body or block and mounted solely by the tongue or projection 32. The latter forms an extension of and an interconnecting link between the terminal portions 34 of the loop.

The loop or ball 28, as mentioned above, is slidable relative to the stroke, but for the purposes of carrying out the principles of the invention, either element may be movable relative to the other. However, it is desired that the stroke be fixed and the loop be movable, in view of the fact that the stroke is of a length substantially the dimension of the block in that direction and on moving the loop to either extreme the entire character remains within the confines of the face of the block. The channel or groove 30 in the stroke is of appropriate length for accommodating movement of the loop to the limits desired according to the shape of the letter represented. In Fig. 2 the loop is shown in full lines in one limit position and in dotted lines in its other limit position.

In the use of the model it is oriented to the viewer or student similarly to the orientation of Fig. 2; that is, the face 21 is presented to the viewer, the top face also being presented, of course, the model being canted for that purpose. In such position of the model the character 24, in the position it assumes in Fig. 2, is read directly as the letter "p." When the model is then rotated about the axis 36 in the same manner as described above in connection with Fig. 1, the character, if printed on paper, would appear as the letter "b." This condition is represented in Fig. 4, where the character on the model appears as a "p," but when inverted and read as if through the block and as if printed, it appears as the letter "b."

The same character, but in a reverse attitude, can be used for demonstrating the condition of the printed letter "p." For this phase attention is directed to Fig. 5, where the loop or ball 28 is in the opposite position with respect to the stroke, namely in the dotted line position of Fig. 2. In this position the character, when read directly on the model, appears as the letter "b," but when inverted as is done in printing, the character appears, as if read through the block and as if printed on the paper, as the letter "p."

Thus, the same model or device 17 of Fig. 2 is utilized for demonstrating the similarities and differences between the letters "b" and "p," both when read directly on printing type and when printed. The device may be utilized in detail in the following manner. The demonstrator (or user) may arbitrarily set the ball or loop in either extreme position, and for present purposes assume that it is placed in the position shown in Fig. 2. The letter when read directly is read as the letter "p" and the user instinctively knows that the printed letter is not the same as that when viewed directly. In the present case he would know that the letter as viewed when read directly on the model would be, when printed, that letter represented when viewed directly when the loop is at the opposite limit position. For example, knowing that the type having the loop positioned as in Fig. 2 would not print as that character, he merely slides the loop to the opposite position to indicate what the printed letter would be. Thus, in the example assumed, a type having the elements arranged as in Fig. 2 ("p") would print as when the loop is in the opposite and dotted line position ("b"). The same process is utilized in the opposite sense, namely a type having the loop in the dotted line position or "lower end" would print a character on paper the same as appears on the model when the loop is at the upper end.

The model 17 serves to distinguish the letters "b" and "p" and to take care of the other two of the "four demons," a counterpart model 40 is provided for distinguishing the letters "d" and "q." The use and general arrangement of the model 40 is the same as that of the model 17, but with the difference that the characters are reversed with respect to a longitudinal axis on the upper face 22 extending between the faces 21 and 19. In other words, in the model 17 the stroke is at the left-hand side of the upper face 22 with the loop to the right thereof, while in the model 40 the stroke is at the right-hand side of the upper face with the loop to the left thereof. It will be realized that the same model would not effectively be used for both sets of letters, even assuming the model can be turned end for end about a vertical axis. If this were attempted it may lead to confusion due to the fact that the notches or grooves are located in predetermined faces in both cases. It is, of course, desirable to provide such notches or grooves in order to provide in the model all of the appearance features of the actual type itself.

While I have disclosed herein a certain preferred embodiment of the invention, it will be understood that changes may be made therein within the scope of the appended claims.

I claim:

1. A demonstration device of the character disclosed, comprising a block having an upper face, and means forming a representation of a letter of the alphabet on said upper face including a pair of elements in raised form, said elements including a relatively straight stroke having a hollow portion forming a groove extending substantially the length of the stroke, and a loop having a tongue portion fitted in said groove for sliding movement of the loop along the length of the stroke between limit positions adjacent the ends of the stroke, said loop having supporting engagement on said face of the block and being guided by the tongue and groove engagement between the loop and stroke, said elements forming a different letter of the alphabet at each of opposite positions of the loop at the ends of the stroke.

2. A demonstration device of the character disclosed comprising a block having a demonstration position oriented according to a position of printing type when viewed as in setting such type, and having indicia for indicating position orientation thereof, and means representing a letter of the alphabet on an upper face including elements raised from said face, said elements including a relatively straight stroke positioned adjacent the left edge of said face as viewed in said position, and a loop to the right of the stroke and slidable along the stroke between positions at the ends thereof and together with the stroke representing the letters "p" and "b" respectively at the positions at the ends of the stroke.

3. A demonstration device of the character disclosed comprising a block having a demonstration position oriented according to a position of printing type when viewed as in setting such type, and having indicia for indicating position orientation thereof, and means representing a letter of the alphabet on an upper face including elements raised from said face, said elements including a relatively straight stroke positioned adjacent the right edge of said face as viewed in said position, and a loop to the left of the stroke and slidable along the stroke between positions at the ends thereof and together with the stroke representing the letters "d" and "q" respectively at the positions at the ends of the stroke.

References Cited in the file of this patent

UNITED STATES PATENTS

| 736,070 | Chandler | Aug. 11, 1903 |
| 842,690 | Oswalt | Jan. 29, 1907 |
| 866,723 | Hill | Sept. 24, 1907 |
| 1,563,265 | Dixon | Nov. 24, 1925 |
| 1,733,104 | Thies | Oct. 22, 1929 |
| 2,462,502 | Horwitz | Feb. 22, 1949 |

FOREIGN PATENTS

| 16,612 | Great Britain | July 27, 1896 |
| 419,001 | Great Britain | Nov. 5, 1934 |